United States Patent [19]

Chen

[11] Patent Number: 4,809,062
[45] Date of Patent: * Feb. 28, 1989

[54] OPTICAL COLOR LINE SCANNING AND IMAGING DEVICE HAVING A ROLLER DRIVE

[75] Inventor: Philip L. Chen, Ranchos Palos Verdes, Calif.

[73] Assignee: Microtek Lab., Inc., Gardena, Calif.

[*] Notice: The portion of the term of this patent subsequent to May 19, 2004 has been disclaimed.

[21] Appl. No.: 125,202

[22] Filed: Nov. 25, 1987

Related U.S. Application Data

[63] Continuation-in-part of Ser. No. 671,293, Nov. 14, 1984, Pat. No. 4,667,253, and a continuation-in-part of Ser. No. 839,612, Mar. 14, 1986, abandoned.

[51] Int. Cl.[4] .................. H04N 1/46; H04N 1/028; H04N 1/10
[52] U.S. Cl. ........................... 358/75; 358/293; 358/294
[58] Field of Search ............... 358/42, 75, 294, 285, 358/293

[56] References Cited

U.S. PATENT DOCUMENTS

| | | | |
|---|---|---|---|
| 1,897,219 | 2/1933 | Schröter | 358/294 |
| 3,264,407 | 8/1966 | Headd et al. | 358/293 |
| 3,560,646 | 2/1971 | Buc | 358/294 |
| 3,566,119 | 2/1977 | Lewis | 250/353 |
| 4,199,789 | 4/1980 | Yvard | 358/294 |
| 4,205,349 | 5/1980 | Kawazu et al. | 358/294 |
| 4,220,978 | 9/1980 | Rhyins et al. | 358/293 |
| 4,266,251 | 5/1981 | Hara et al. | 358/293 |
| 4,275,423 | 6/1981 | Takahashi et al. | 358/293 |
| 4,442,459 | 4/1984 | Fukui et al. | 358/293 |
| 4,477,836 | 10/1984 | Vetjens | 358/294 |
| 4,481,414 | 11/1984 | Gasper | 358/294 |
| 4,542,414 | 9/1985 | Nagane | 358/293 |
| 4,556,903 | 12/1985 | Blitchington et al. | 358/294 |
| 4,558,373 | 12/1985 | Plasencia et al. | 358/293 |
| 4,570,179 | 2/1986 | Lees | 358/294 |
| 4,586,076 | 4/1986 | Watt | 358/294 |
| 4,595,947 | 6/1986 | Brueggemann | 358/294 |
| 4,667,253 | 5/1987 | Chen | 358/293 |

FOREIGN PATENT DOCUMENTS

| | | | |
|---|---|---|---|
| 54-47416 | 4/1979 | Japan | 358/294 |
| 54-53915 | 4/1979 | Japan | 358/294 |
| 56-58370 | 5/1981 | Japan | 358/75 |
| 56-161772 | 12/1981 | Japan | 358/294 |
| 57-72468 | 5/1982 | Japan | 358/294 |
| 57-211871 | 12/1982 | Japan | 358/75 |
| 58-6667 | 1/1983 | Japan | 358/75 |
| 58-19072 | 2/1983 | Japan | 358/294 |
| 58-39184 | 3/1983 | Japan | 358/75 |
| 58-80965 | 5/1983 | Japan | 358/75 |
| 59-57566 | 4/1984 | Japan | 358/75 |
| 59-101962 | 6/1984 | Japan | 358/75 |
| 60-114070 | 6/1985 | Japan | 358/75 |
| 60-142666 | 7/1985 | Japan | 358/75 |

Primary Examiner—James J. Groody
Assistant Examiner—Randall S. Svihla
Attorney, Agent, or Firm—Edward A. Sokolski

[57] ABSTRACT

Material such as a document or picture of which an image is to be reproduced or transmitted, as in a facsimile device, is driven by pinch rollers past a light source in a controlled synchronized manner by means of a stepping motor. As the pinch rollers are driven, successive scan line images of the document are channelled through an elongated slit in a light directing channel and through a lens and a rotatably driven color wheel onto a light sensitive device such a linear array formed by a charge-coupled device (CCD). The color wheel has light filters for the primary colors and is synchronized with the scanning. The images received by the CCD are converted thereby to electrical form and appropriately processed for transmission or local utilization. A mechanism is provided to enable the disengagement of the pinch rollers from the material being scanned to avoid damage to such material should it become jammed in the rollers.

2 Claims, 3 Drawing Sheets

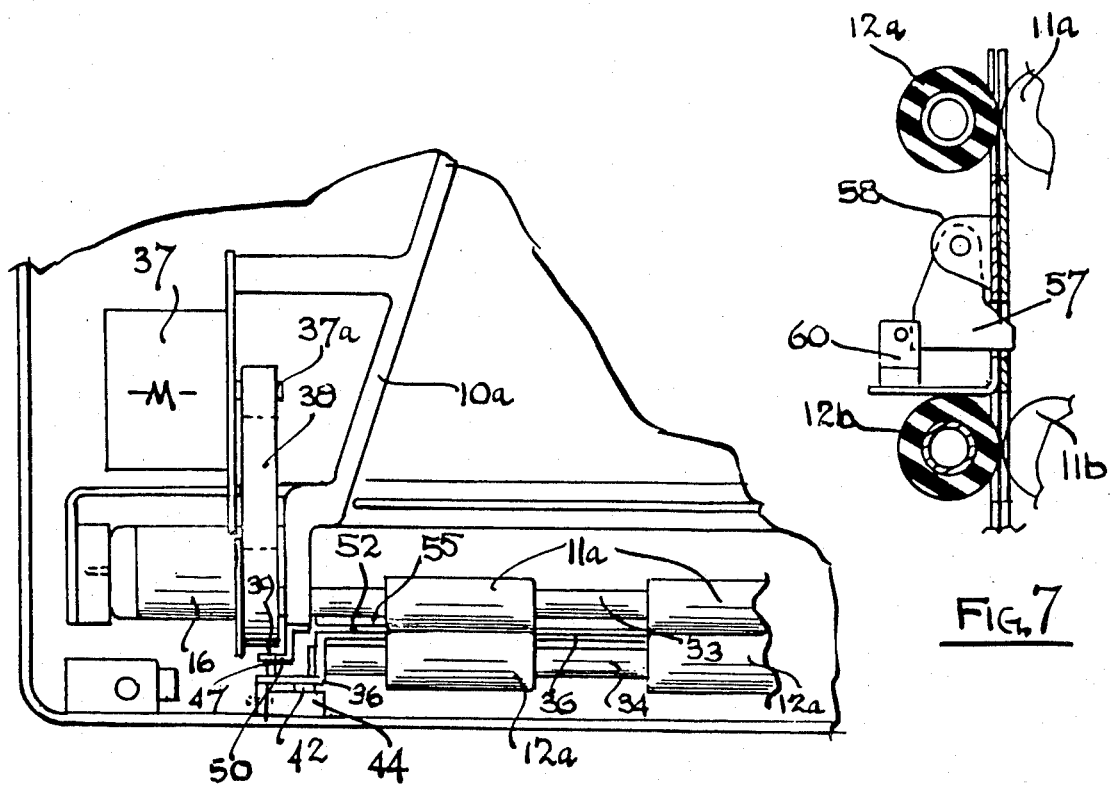
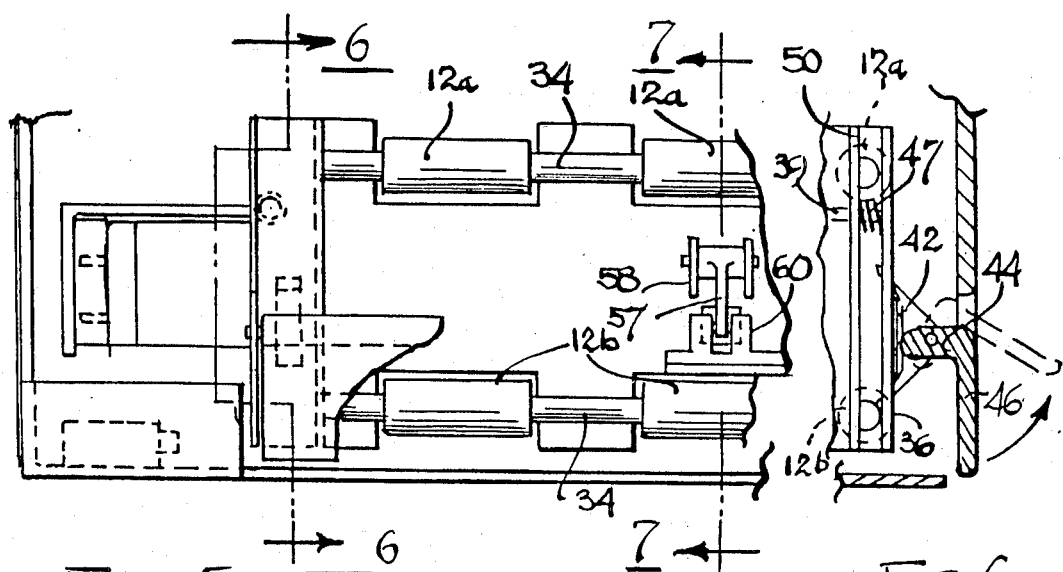

OPTICAL COLOR LINE SCANNING AND IMAGING DEVICE HAVING A ROLLER DRIVE

This application is a continuation-in-part of my application Ser. No. 671,293 filed Nov. 4, 2984, now U.S. Pat. No. 4,667,253, and my application Ser. No. 839,612, filed Mar. 14, 1982, now abandoned.

This invention relates to an optical line scanning imaging device and more particularly to an optical scanner capable of reproducing color suitable for use in generating images for facsimile transmission.

In my application Ser. No. 671,293 of which the present application is a continuation-in-part, an optical linear scanning system is described which is capable of producing black and white images and which utilizes a pinch roller drive mechanism which drives material to be imaged past a light source. Successive scan line images which may comprise document or picture information are formed into a narrow line image which is directed through a channel to an imaging lens. The image is focused by the lens onto a linear photo-sensitive detector array, such as a charge-coupled detector (CCD), which converts the image into electrical signals. These electrical signals may be fed to an appropriate conventional signal processor which placed them in proper form for transmission or for utilization on a local imaging device. The commencement of the scanning is signaled by means of a position detector which mechanically senses when the material to be scanned enters the imaging area and again when it leaves such area, such that the scanning can be properly synchronized. The system of the present invention is a modification to the device of my aforementioned prior patent application in that is provides the capability of reproducing color images. This end result is achieved by means of a synchronized color wheel having red, green and blue filters which is placed in the optical scanning path and driven rotatably in synchronization with the scanning operation.

It is therefore an object of this invention to provide a simple and economical optical line scan color imaging device.

It is a further object of this invention to provide a highly reliable color line scanner suitable for providing imaging signals for use in facsimile transmission which is easy to operate, maintain and service.

Other objects of the invention will become apparent as the description proceeds in connection with the accompanying drawings of which:

FIG. 4 is a top plan sectional view illustrating the pinch rollers and drive mechanism of the preferred embodiment;

FIG. 5 is a front elevational sectional view illustrating the pinch rollers;

FIG. 6 is a cross sectional view taken along 6—6 in FIG. 5; and

FIG. 7 is a cross sectional view taken along 7—7 in FIG. 5.

Except for the addition of the color wheel mechanism, the device of the present invention is the same as that of my prior application and the disclosure of that application is incorporated herein by reference. The basic operations of the device will therefore be but briefly described in the present application.

Figure 1:
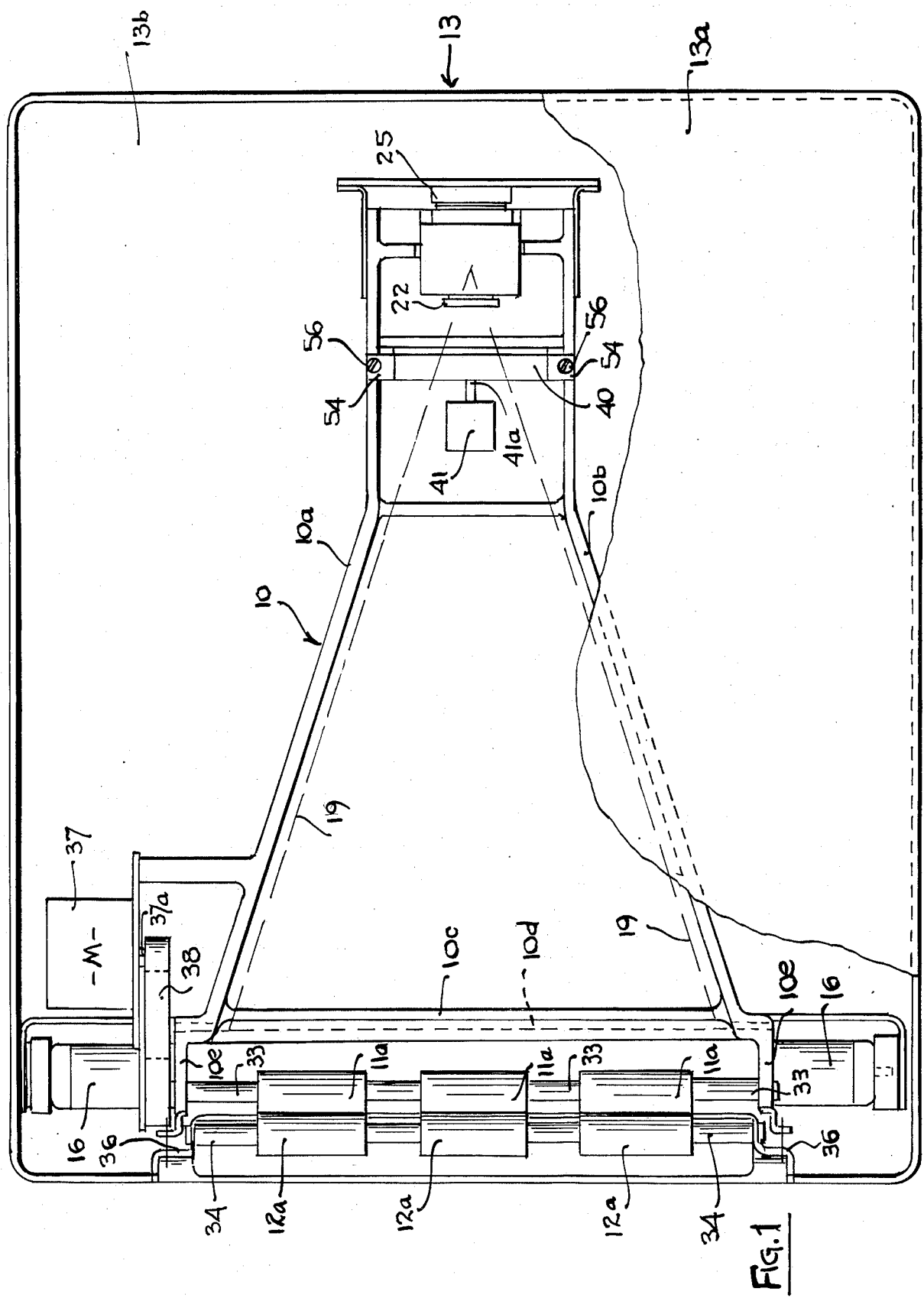
FIG. 1 is a top plan view of a preferred embodiment of the invention.

Referring now to FIG. 1 the device includes pairs of pinch rollers 11a, 12a and 11b, 12b (See FIGS. 5 and 6) by means of which a document (not shown) to be imaged is driven. Light from light source 16 which may comprise an incandescent or a fluorescent light excited by DC, provides light onto the face of the document. As explained in my application No. 671,293, this light is channelled in a flat linear conical beam 19 to effectively provide a succession of line scan images of the document as it passes between the rollers. The beam 19 passes through color wheel 67 contained in housing 40 which is synchronously driven by stepping motor 41 as to be explained in connection with FIGS. 2 and 3. The light in beam 19 is sequentially filtered by red, blue and green filters to provide the correspondent components of these colors in the image being scanned. The color images in beam 19 are focused by lens 22 onto photosensitive linear detector array 25 which may comprise a charge-coupled device (CCD). The output of detector array 25 which is in the form of electrical signals representing the image, is fed to a signal processor (not shown) which appropriately processes the image signals by techniques well known in the art. The output of such a signal processor may be fed to a host computer through appropriate interface circuitry.

Mounted within casing 13 is an upstanding wall structure 10 which includes oppositely positioned walls 10a and 10b which diverge from each other towards the rollers 11a, 12a in the general shape of a fan. The diverging ends of walls 10a and 10b are interconnected by a wall member 10c. Casing member 13 has a top cover 13a as well as a bottom portion 13b such that the interior of the casing is substantially closed off from ambient light. Thus, wall structure 10 forms a light channel which channels light between the material being scanned and the optical image forming portions of the system. Wall member 10c has an elongated narrow slot 10d formed therein which forms the light into a flat beam.

Rotatably supported on support flanges 10e is a shaft member 33 which has a plurality of rollers 11a, which may be of rubber fixedly attached thereto. Directly opposite shaft 33 is a similar shaft 34 which is rotatably supported on brackets 36 which in turn are supported in "floating" fashion on the wall of casing 13. The paired rollers 11a, 12a and 11b, 12b form pinch rollers for driving the material to be scanned through the scanning area with rollers 11a, 11b forming drive rollers and 12a, 12b forming idlers. Rollers 11a and 11b are rotatably driven by means of a stepping motor 37 which, as best can be seen in FIG. 4, drives a drive belt 38 which interconnects the output shaft 37a of the stepping motor with pulley wheels (not shown) fixedly attached to shafts 33.

As best can be seen in FIGS. 5 and 6, the support brackets for the idler roller shafts 34 are supported on pin member 39 for limited freedom of motion towards and away from drive rollers 11a and 11b. The idler rollers 12a and 12b, as best can be seen in FIG. 6, are resiliently urged against the drive rollers 11a and 11b respectively by means of leaf springs 42 and arm member 44 which normally abuts against this spring. To release the idler rollers from the drive rollers, such as for example as in the case of a paper jam or other malfunction, plate 46 need merely be lifted upwardly as indicated in FIG. 6 by the arrow and dashed illustration. In such case, the pressure against spring 42 is released and plate 46, and along with it roller shafts 34 and rollers 12a, 12b, are urged away from rollers 11a, 11b by coil springs 47 which are installed on pins 39 between plate 50, which is fixedly attached to the casing, and floating brackets 36. A small separation is provided at all times between the floating brackets 36 and the fixed plate 55 by projections 52 which are formed on the walls of floating bracket member 36 and abut against fixed plate 55 which is mounted on the casing. Mounted within the casing between and forward of rollers 11a and 11b is fluorescent lamp 16 which provides a light source for the imaging. The entry of the material to be scanned between the rollers is sensed by a pivotally mounted sensing arm 57, this arm being pivotally mounted on bracket member 58 attached to the casing. When the material being scanned is between the rollers, arm 57 is driven towards detector member 60, which may be in optical, magnetic or mechanical detector, which is actuated by such movement of arm 57. Detector 60 thus provides a signal to the control circuitry indicating when material being scanned enters the rollers and leaves the rollers, thus facilitating proper control of the imaging system.

Figure 2:
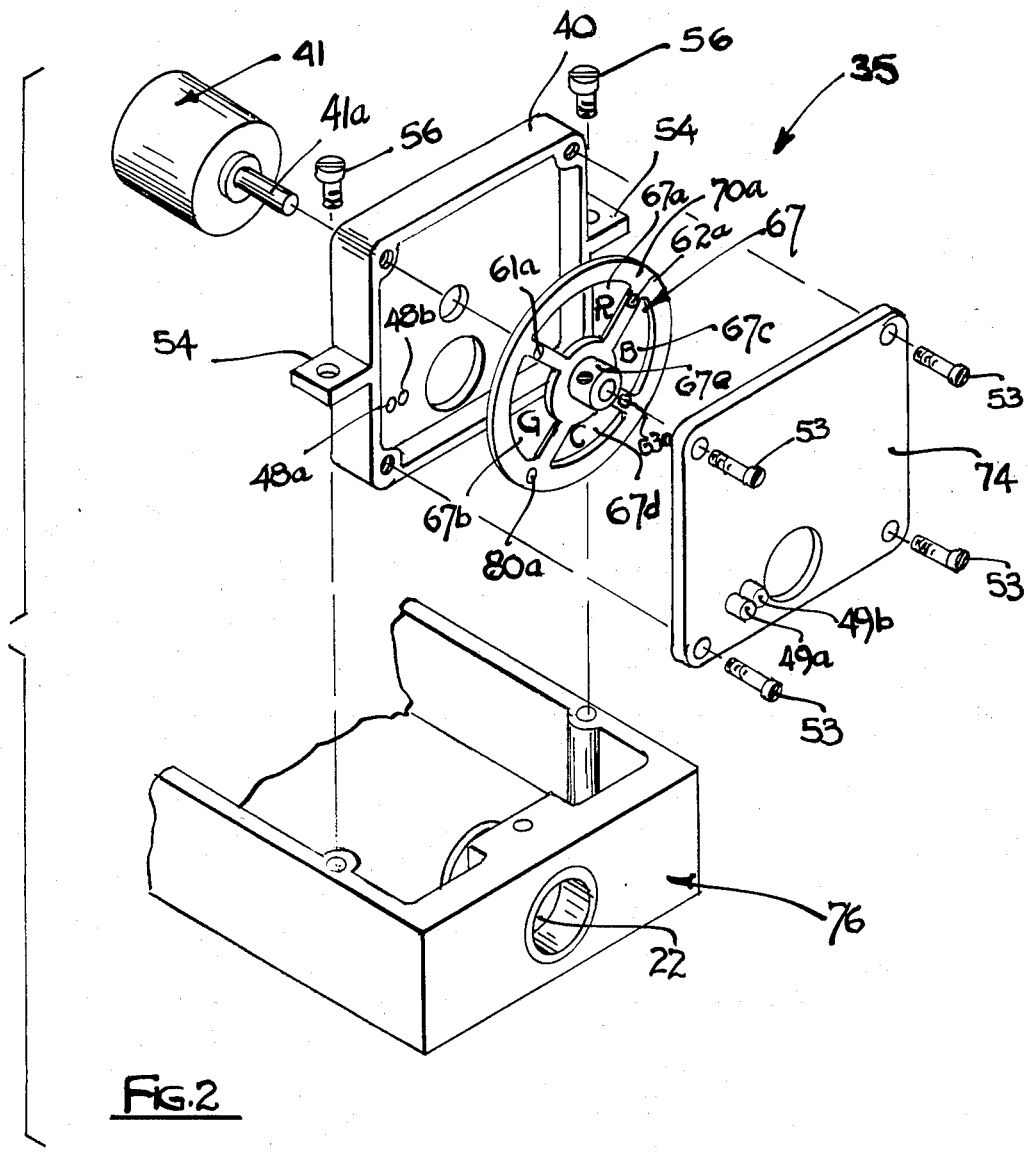
FIG. 2 is a perspective exploded view of the preferred embodiment of the color scanning mechanism of the invention.
Figure 3:
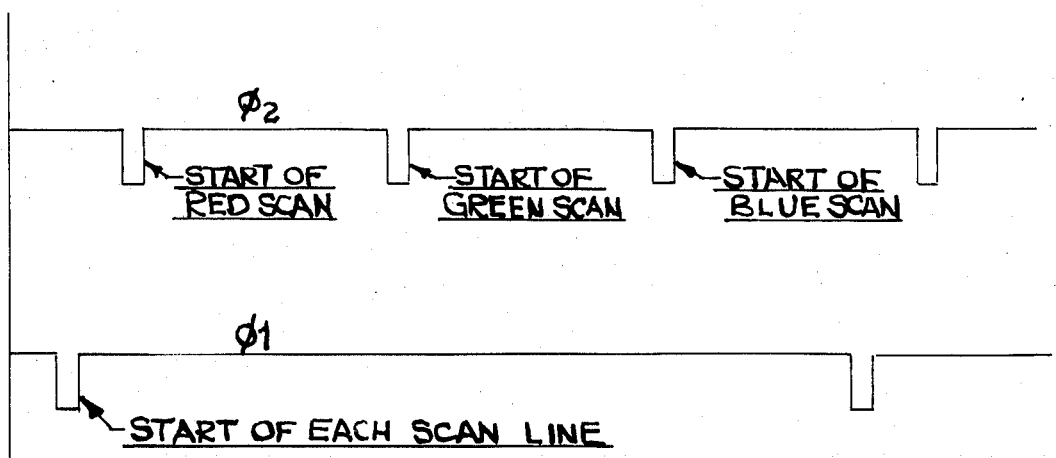
FIG. 3 is a timing diagram illustrating the synchronization of the color wheel of the preferred embodiment.

Referring now to FIG. 2 a preferred embodiment of the color module 35 is illustrated. Color wheel 67 has color filters 67a, 67b and 67c mounted therein to provide filtering for red, green and blue light respectively. A clear window 67d is also provided in the color wheel where only black and white imaging is desired in which case the wheel can be locked in position so that all of the light passes through the window. The hub portion 67e of the color wheel is attached to the drive shaft 41a of stepping motor 41 by means of a set screw. The color wheel is housed within housing 40 which has a cover plate 74 attached to the housing by means of screws 53. The housing 40 is mounted on the scanner chassis 76 by means of brackets 54 and screws 56. Mounted in cover plate 74 are a pair of light emitting diodes 49a and 49b which are aligned respectively with photodetectors 48a and 48b. Apertures 70a and 80a formed in color wheel 67 are aligned with LED 49a and photo detector 48a momentarily during each rotation cycle while apertures 61a, 62a and 63a are each momentarily aligned with LED 49b and photodetector 48b during each rotational scan of the wheel. The output of photo detectors 48a and 48b are fed to an appropriate signal processor to signal the start of each scan line and the start of the red, green and blue scanning modes, respectively as shown in FIG. 3. Aperture 80a is used for providing a synchronization signal where the document being scanned is black and white.

In this manner, the color content of the image being scanned is synchronously detected and reproduced. The document being scanned is kept stationary for each rotation of the color wheel and then moved up to a new line to be scanned in response to the "start of each scan line" signal generated by photo detector 48a as shown in FIG. 3. In view of the different sensitivities of the CCD sensors to light for each color, the gain of the video amplifier in the processing circuitry must be automatically adjusted at the start of the scan for each other. This adjustment is made in response to the synchronization signals developed in photo detector 48b. Where a Kodak Wratten No. 47b filter was used for blue filter 47c and Kodak Wratten No. 58 filter employed for green filter 47b and a Kodak Wratten No. 25 filter for red filter 47a the gain ratio as compared to that for black and white scanning is as follows:

B. Blue (Kodak Wratten No. 47b)—8 times black and white

G. Green (Kodak Wratten No. 58)—5 times black and white

R. Red (Kodak Wratten No. 25)—4 times black and white.

The video and synchronization signals are fed to an appropriate processor where they may be digitized for transmission or local utilization.

While the invention has been described and illustrated in detail, it is to be clearly understood that this is intended by way of illustration and example only and is not to be taken by way of limitation, the spirit and scope of the invention being limited only by the terms of the following claims.

I claim:

1. An optical line scanning and imaging system for generating electrical signals corresponding to successive linear elements of colored material which may include picture or document information comprising:

a light source, means for successively driving linear elements of said material past said light source to form line images of said material including a set of drive rollers, fixed plate means for rotatably supporting said set of drive rollers, motor means for rotatably driving said set of drive rollers, a set of idler rollers, and floating bracket means for rotatably supporting said idler rollers in opposing relationship to said drive rollers, first spring means for resiliently urging the floating bracket means and therewith the idler rollers linearly towards the drive rollers, second spring means for resiliently urging the floating bracket means and therewith the idler rollers linearly away from the drive rollers, pivotally supported arm means for actuating said first spring means so as to urge said idler rollers linearly toward said drive rollers against the urging action of said second spring means in a first pivotal position of said arm means and for releasing said first spring means so as to permit said second spring means to urge the idler rollers linearly away from said drive rollers in a second pivotal position of said arm means, means for forming the line images into a flat light beam, a linear array of detectors, means running from said light source towards said detectors for channeling said light beam convergently towards said array of detectors, lens means for focusing the light beam onto said array of detectors, a color wheel having red, blue and green filters each encompassing a predetermined segment of said wheel, means for rotatably supporting said wheel in the path of said light beam at a position in said path before said light beam reaches the lens means, drive means for rotatably driving said color wheel, a housing surrounding said color wheel, said housing having apertures formed therein to permit said light beam to pass through only one of said color filters at a time as said wheel is rotatably driven, light source means mounted in said housing on one side of said color wheel, light detector means mounted in said housing on the side of said color wheel opposite said one side thereof, said light detector means being aligned with said light source means, and a plurality of apertures formed in said wheel, each of said plurality of apertures being momentarily aligned with said light source means and said light detector means during each rotation of said wheel, said plurality of apertures being positioned on said wheel so as to permit light to pass from said light source means to said light detector means at the start of each rotation of said wheel and as the red, green and blue filters first appear opposite the apertures formed in said housing.

2. The system of claim 1 wherein said light source means comprises a pair of light sources and said light detector means comprises a pair of detectors, each of said last mentioned pair of detectors being aligned with a respective one of said light sources, the plurality of apertures in said color wheel comprising a first aperture which is momentarily aligned with one of said detectors and one of said light sources during each rotation of said wheel, and second, third and fourth apertures each being momentarily aligned with the other of said detectors and the other of said light sources during each rotation of said wheel.

* * * * *